(12) United States Patent
Hallundbæk et al.

(10) Patent No.: US 9,353,607 B2
(45) Date of Patent: May 31, 2016

(54) INFLOW CONTROL IN A PRODUCTION CASING

(75) Inventors: Jørgen Hallundbæk, Græsted (DK); Paul Hazel, Aberdeenshire (GB)

(73) Assignee: WELLTEC A/S, Allerød (DK)

( * ) Notice: Subject to any disclaimer, the term of this patent is extended or adjusted under 35 U.S.C. 154(b) by 918 days.

(21) Appl. No.: 13/513,736

(22) PCT Filed: Dec. 3, 2010

(86) PCT No.: PCT/EP2010/068817
§ 371 (c)(1),
(2), (4) Date: Jul. 17, 2012

(87) PCT Pub. No.: WO2011/067371
PCT Pub. Date: Jun. 9, 2011

(65) Prior Publication Data
US 2012/0305243 A1      Dec. 6, 2012

(30) Foreign Application Priority Data

Dec. 3, 2009     (EP) ..................................... 09177927

(51) Int. Cl.
*E21B 43/12* (2006.01)
*E21B 34/08* (2006.01)
*F16K 17/12* (2006.01)
(Continued)

(52) U.S. Cl.
CPC ................. *E21B 43/12* (2013.01); *E21B 34/08* (2013.01); *E21B 43/123* (2013.01); *F16K 7/12* (2013.01); *F16K 7/17* (2013.01)

(58) Field of Classification Search
CPC ............... F16K 3/03; F16K 7/00; F16K 7/14; F16K 7/17; F16K 7/12; F16K 7/123; F16K 7/126; F16K 7/20; E21B 43/123; E21B 21/103; E21B 43/121; E21B 43/122; E21B 43/12; E21B 34/08
See application file for complete search history.

(56) References Cited

U.S. PATENT DOCUMENTS 1,767,201 A     6/1930    Boynton
2,274,062 A *   2/1942    Hays .............................. 417/112
(Continued)

FOREIGN PATENT DOCUMENTS

CN    1576514         2/2005
CN    101473104       7/2009
(Continued)

OTHER PUBLICATIONS

Notification and International Preliminary Report on Patentability for corresponding PCT Application PCT/EP2010/068817, issued Jun. 5, 2012, 14 pages.
(Continued)

*Primary Examiner* — Blake Michener
*Assistant Examiner* — Kipp Wallace
(74) *Attorney, Agent, or Firm* — Nixon & Vanderhye P.C.

(57) ABSTRACT

The present invention relates to a downhole inflow control system for controlling an inflow of fluid into a casing from outside the casing, such as from a reservoir or an intermediate casing. The downhole inflow control system comprises a casing having an axial extension and a wall having a wall thickness (t), an inflow control valve having a housing, an axial extension in an axial direction along the housing, and a spring element moving in relation to the housing, thereby controlling the inflow of fluid through the valve from an inlet of the housing to an outlet of the housing.

21 Claims, 8 Drawing Sheets

(51) Int. Cl.
*F16K 7/17* (2006.01)
*F16K 7/12* (2006.01)

(56) References Cited

U.S. PATENT DOCUMENTS

| | | | |
|---|---|---|---|
| 2,556,867 A | | 6/1951 | Calvert et al. |
| 2,624,362 A | | 1/1953 | Church |
| RE24,015 E | * | 5/1955 | Walton .......................... 417/112 |
| 2,777,464 A | | 1/1957 | Mosely |
| 3,355,939 A | * | 12/1967 | Van Gils ..................... 73/152.51 |
| 5,535,828 A | | 7/1996 | der Kinderen et al. |
| 6,354,378 B1 | | 3/2002 | Patel |
| 6,786,285 B2 | | 9/2004 | Johnson et al. |
| 7,387,165 B2 | | 6/2008 | Lopez de Cardenas et al. |
| 2002/0189815 A1 | | 12/2002 | Johnson et al. |
| 2005/0016727 A1 | | 1/2005 | Fields |
| 2006/0027377 A1 | | 2/2006 | Schoonderbeek et al. |
| 2007/0256840 A1 | * | 11/2007 | Aakre .......................... 166/369 |
| 2008/0099081 A1 | * | 5/2008 | Yamamoto ................... 137/497 |
| 2008/0135226 A1 | | 6/2008 | Lewis et al. |
| 2009/0218103 A1 | | 9/2009 | Aakre et al. |
| 2010/0108148 A1 | * | 5/2010 | Chen et al. ........................ 137/2 |
| 2011/0067878 A1 | | 3/2011 | Aadnoy |

FOREIGN PATENT DOCUMENTS

| | | |
|---|---|---|
| CN | 101490360 | 7/2009 |
| RU | 2153055 | 7/2000 |
| WO | WO 95/22682 | 8/1995 |
| WO | WO 2007/148269 | 12/2007 |
| WO | WO 2008/004875 | 1/2008 |
| WO | WO 2009/136796 | 11/2009 |

OTHER PUBLICATIONS

International Search Report for PCT/EP2010/068817, mailed Apr. 21, 2011.
Written Opinion of the International Searching Authority for PCT/EP2010/068817, mailed Apr. 21, 2011.
Russian Office Action issued in Russian Patent Application No. 2012126669 dated Nov. 10, 2014 (with English-language explanation of relevance).
Chinese Office Action and English Translation for corresponding Chinese Application No. 201080054908.0, dated Mar. 17, 2014, 18 pages.

* cited by examiner

INFLOW CONTROL IN A PRODUCTION CASING

This application is the U.S. national phase of International Application No. PCT/EP2010/068817, filed 3 Dec. 2010, which designated the U.S. and claims priority to EP Application No. 09177927.2, filed 3 Dec. 2009, the entire contents of each of which are hereby incorporated by reference.

TECHNICAL FIELD

The present invention relates to a downhole inflow control system for controlling an inflow of fluid into a casing from outside the casing, such as from a reservoir or an intermediate casing. The downhole inflow control system comprises a casing having an axial extension and a wall having a wall thickness, an inflow control valve having a housing, an axial extension in an axial direction along the housing, and a spring element moving in relation to the housing, thereby controlling the inflow of fluid through the valve from an inlet of the housing to an outlet of the housing.

BACKGROUND

In an oil or gas production well, the fluid path from the formation to the casing has traditionally flown directly into the casing from the rock (barefoot completion) or through perforations in the casing wall. More recently, slotted liners, sliding sleeves or screens have been introduced, all creating a simple flow path into the casing.

These solutions have traditionally relied on the flow being generated by creating a differential pressure from the reservoir to the well bore for production.

More recently, devices have been installed within the well bore, enabling control of the differential pressure via a fixed orifice type valve. As the pressure across the fixed orifice increases, so does the flow rate through the valve. These systems are commonly referred to as passive Inflow Control Devices (ICD).

More recently, valves have been introduced whereby the pressure differential can be varied via surface control, either via hydraulic conduits or via electrical lines, the control allowing adjustment of the orifice to vary the pressure drop across the valve and thereby alter the flow rate through the valve.

The complex nature of the flow path from the reservoir to the surface of a well and the many varying flow regimes which the fluid endure make it very difficult to predict the pressure drop from the formation to the well bore for production wells. Thus, it is difficult to predict in advance the size of the orifice of the valve to be installed or how to control valves from the surface in an optimal manner, which makes efficient reservoir production difficult.

Additionally, as the well produces with time, the heterogeneities in the formation and the changing conditions in the well will produce pressure variations between the formation and the well bore.

DESCRIPTION OF THE INVENTION

It is an object of the present invention to wholly or partly overcome the above disadvantages and drawbacks of the prior art. More specifically, it is an object to provide an alternative inflow control valve which makes it easier to control the inflow of fluid from the reservoir into a casing.

The above objects, together with numerous other objects, advantages, and features, which will become evident from the below description, are accomplished by a solution in accordance with the present invention by a downhole inflow control system for controlling an inflow of fluid into a casing from outside the casing, such as from a reservoir or from an intermediate casing, comprising:
- the casing having an axial extension and a wall having a wall thickness,
- an inflow control valve having a housing, an axial extension in an axial direction along the housing, and a spring element moving in relation to the housing, thereby controlling the inflow of fluid through the valve from an inlet of the housing to an outlet of the housing, wherein the valve is arranged so that the axial direction of the valve is perpendicular to the axial extension of the casing.

The inflow control valve having an axial direction perpendicular to the axial extension of the casing allows for insertion of the valve from within the casing when the completion has been made. During production of hydrocarbon or oil, the reservoir moves as the oil is brought up, and the inflow control valves then have to be inserted to ensure that the inflow passage moves as intended. Prior art valves are typically inserted when making a completion, and when the reservoir of oil moves, the valves are no longer positioned correctly, meaning that only oil, and not water, is able to enter the casing. The valve according to the invention can be inserted in a subsequent operation when the oil reservoir moves.

In one embodiment, the axial extension of the valve may be substantially the same as or smaller than the thickness of the casing wall.

Further, the spring element may be springy along the axial direction of the valve being perpendicular to the axial extension of the casing, thereby providing a spring force.

Moreover, the inlet of the housing may extend from an outer face of the housing to an inner face of the housing in a radial direction of the casing, enabling direction of the fluid in the radial direction.

In another embodiment, a downhole inflow control system may further comprise a sleeve arranged opposite the valve and being able to slide from an open position to a closed position.

Having a slidable sleeve opposite the valve as part of the casing wall allows for closing of the sliding sleeve when the casing is pressurised from within in order to perform an operation requiring highly pressurised fluid, e.g. when expanding annular barriers. When the operation requiring high pressure is finalised, the sliding sleeve can be opened, thereby enabling fluid from the annulus to flow into the casing through the valve.

In addition, the sleeve may slide back and forth in a recess in the wall of the casing and form part of the wall thickness.

Hereby, the inner diameter of the casing is not decreased, which may limit subsequent operations in the well.

The downhole inflow control system may comprise a tool for placing a valve in a casing, the tool comprising:
- a milling head extendable in a radial direction of the tool for creating an opening in the casing wall,
- a device, such as a miller, a tap, a cutting device or a thread maker, for creating a fastening recess or threads in the opening, and
- an insertion means, such as a pushing guide, for inserting a valve into the opening.

Further, the downhole inflow control system may comprise a tool for retrieving a valve in a casing wall, the tool comprising:
- a key means for being inserted into a recess in the valve, and rotation means connected to the key means for rotating the valve to unthread the valve or for releasing the fastening means of the valve in order to retrieve the valve.

The invention also relates to a downhole inflow control valve insertable into the wall of the casing of the completion, the valve may comprise:
a housing and an axial direction along the housing, and
a spring element which is springy along the axial direction of the valve and perpendicular to the axial extension of the casing to provide a spring force for controlling a flow of fluid through the valve from an inlet to an outlet of the housing.

The downhole inflow control valve may further comprise:
a piston element sliding within the housing and comprising a face and at least one side abutting the housing and extending from the face towards the outlet of the housing, the face facing the inlet and having a piston hole allowing the fluid from the inlet to flow through the piston hole and out through the outlet, and
the spring element arranged between the housing and the piston,
wherein the side of the piston element is able to, at least partly, close the outlet in order to reduce the inflow of fluid into the casing.

By having an inflow control valve according to the invention, a very simple design is obtained, making the valve easier to manufacture. Furthermore, it may cause fewer parts to fail when the valve is used downhole. The valve is not designed with long and narrow flow paths which could cause particles to get stuck and block the flow path.

In one embodiment, the housing may have a first, a second and a third wall, the second wall being arranged between the first and the third wall, and the inlet may be arranged in the first wall, and the outlet may be arranged in the second wall.

In another embodiment, the piston element may be a sprung element, such as a sprung diaphragm, which is fasten in the housing and springs up and down in its centre in order to move the side of the piston element for reducing the outlet. In this embodiment, the spring element is not needed.

Furthermore, the housing may be shaped like a hollow cylinder, the piston may be shaped like a hollow cylinder without a bottom, and the piston face may be circular.

In another embodiment, the side of the piston may have an opening which is arranged opposite the outlet of the housing, allowing the fluid to flow out of the housing and into the casing, and when the pressure drops in the reservoir or a debris blocks the inlet, the spring element forces the piston towards the inlet, and the outlet is closed.

In addition, the side of the piston on its outside between the opening and the end farthest away from the piston face may be arranged with a barb or a projection which enters the outlet, causing the piston to be unable to move downwards again.

In yet another embodiment, the fluid in the reservoir may have a first pressure, the fluid after passing the inlet may have a second pressure, the fluid after passing the piston opening may have a third pressure, and the fluid after passing the outlet may have a fourth pressure, and when the second pressure is greater than the third pressure and a spring force of the spring element, the piston may be pushed by the second pressure to, at least partly, close the outlet.

The housing may comprise a cavity in which the piston slides, and the piston may divide the housing into a first cavity part and a second cavity part.

Furthermore, the valve may comprise a plurality of outlets which may be arranged in the same wall of the housing.

In addition, the housing may have a square shape and several second walls.

The spring element may comprise a helical spring, a disk spring, a leaf spring or a rubber element.

The piston element may have a bottom face, and the spring element may be arranged between the bottom face and the housing.

The downhole inflow control valve may further comprise at least one sealing means between the piston and the housing, the sealing means being fastened on the outside of the piston or on the inside of the wall of the housing.

Moreover, the housing may have a seat and the spring element may be a diaphragm acting towards the seat to close an opening.

Further, the diaphragm may comprise at least one valve opening.

The downhole inflow control valve may further comprise a membrane arranged between the seat and the spring element.

The downhole inflow control valve may further comprise a bellows having a bellows opening, wherein the housing comprises a projection tapering inside the housing and the bellows opening is arranged around the projection so that when the bellows are expanded, fluid is unable to enter through the bellows opening, and when unexpanded fluid is allowed to pass the bellows opening and out through the outlet of the valve.

The downhole inflow control valve may further comprise a fastening means for fastening the valve to an opening in the casing.

The fastening means may comprise a thread or the fastening means may comprise a plurality of projecting parts for projecting into a groove in a hole in a wall of the casing, such as a bayonet lock.

Additionally, the downhole inflow control valve may further comprise a unique identifier, such as a chemical or radioactive tracer.

Moreover, the valve may comprise a gas detection means, a water detection means or a density detection means which is able to close the valve if the density is lower or higher than a predetermined density.

In one embodiment, the gas or water detection means or the density detection means may comprise a closing means for closing the outlet or the inlet.

Each valve may comprise a unique identifier, such as a chemical identifier.

The closing means of the detection means may comprise a swellable material which closes the inlet, the outlet or the hole in the piston face when swelling when the fluid contains too much water or gas.

In addition, the detection means may comprise a dissolvable material which may comprise a unique identifier which is released when the material dissolves.

Additionally, the valve may comprise a filter or a screen.

This filter may comprise or be coated with a unique identifier, such as a chemical or radioactive tracer.

Furthermore, the valve may comprise a chamber filled with a unique identifier.

This unique identifier may be a hydrophilic identifier which is released when the fluid contains water.

Moreover, the chamber filled with a unique identifier may be opened by the gas or water detection means.

Further, the casing may be a production casing which is enclosed by a surrounding intermediate casing, and wherein the fluid is gas which is pumped down into the intermediate casing and into the valves of the production casing.

The present invention further relates to a method for fitting a downhole inflow control valve into an existing casing downhole, the casing having a casing wall, the method comprising the steps of:

introducing a tool into the casing and lowering the tool to a predetermined position, providing an opening in the casing wall, inserting the downhole inflow control valve into the opening, and fastening the downhole inflow control valve to the casing wall.

The opening may be provided with a fastening means, such as a thread, enabling the fastening of the valve to the casing wall to be carried out by screwing the valve into the casing wall, or the opening is provided with a fastening means, such as a mechanical locking means, which is adapted to correspond with a corresponding locking means arranged on the valve.

Moreover, the invention relates to a method for replacing a downhole inflow control valve in a casing downhole, the casing having a casing wall, the method comprising the steps of:

introducing a tool into the casing and lowering the tool to the valve to be replaced, unfastening the valve from the casing wall, retrieving the valve from the casing and thereby exposing an opening in the casing wall, inserting a new valve into the opening, and fastening the new valve to the casing wall.

Additionally, the present invention relates to a method for detecting a position of a specific downhole inflow control valve during production among a plurality of inflow control valves arranged spaced apart in a casing wall of a casing downhole, wherein each valve comprises a unique identifier, the method comprising the steps of:

analysing a fluid for the purpose of locating the existence of unique identifiers, comparing the analysis of the fluid with the unique identifier of each valve, and determining the specific valve based on the comparison.

Finally, the invention relates to a tool, wherein the tool for retrieving a valve in a casing wall comprises:

a milling head for creating an opening in the casing wall, a means for creating a fastening recess or threads in the opening, and an insertion means for inserting a valve into the opening, or a key means for being inserted into a recess in the valve and for unthreading the valve, or for releasing the fastening means of the valve in order to retrieve the valve.

The casing of the system may comprise a screen allowing the fluid to flow in through the screen before entering the inflow control valve.

In addition, a sleeve of the system may be arranged within or in connection with the casing opposite the outlet of the valve, enabling the sleeve to close off the outlet of the valve.

Furthermore, the system may comprise control means for controlling the closing of each valve from the surface.

Additionally, the system may comprise means for analysing the fluid for the purpose of locating the existence of unique identifiers.

In addition, this invention relates to a method for mounting a downhole inflow control valve in a casing.

By the inventive idea, it is possible, as a retrofit, to insert downhole inflow control valves in existing wells.

The opening may expediently be provided by milling or drilling.

Moreover, an outlet of the valve may be closed after the fastening of the valve to the casing wall. The closing of the outlet of the valve may be performed by pushing or pressing the piston element or the spring element of the valve, causing it to close off the outlet.

Furthermore, an outlet of the valve may be closed after the fastening of the new valve to the casing wall. The closing of the outlet of the valve may be performed by pushing or pressing the piston element of the valve, causing it to close off the outlet.

BRIEF DESCRIPTION OF THE DRAWINGS

The invention and its many advantages will be described in more detail below with reference to the accompanying schematic drawings, which for the purpose of illustration show some non-limiting embodiments and in which.

All these figures are highly schematic and not necessarily to scale, and they show only those parts which are necessary in order to elucidate the invention, other parts being omitted or merely suggested.

DETAILED DESCRIPTION OF THE INVENTION

Figure 1:
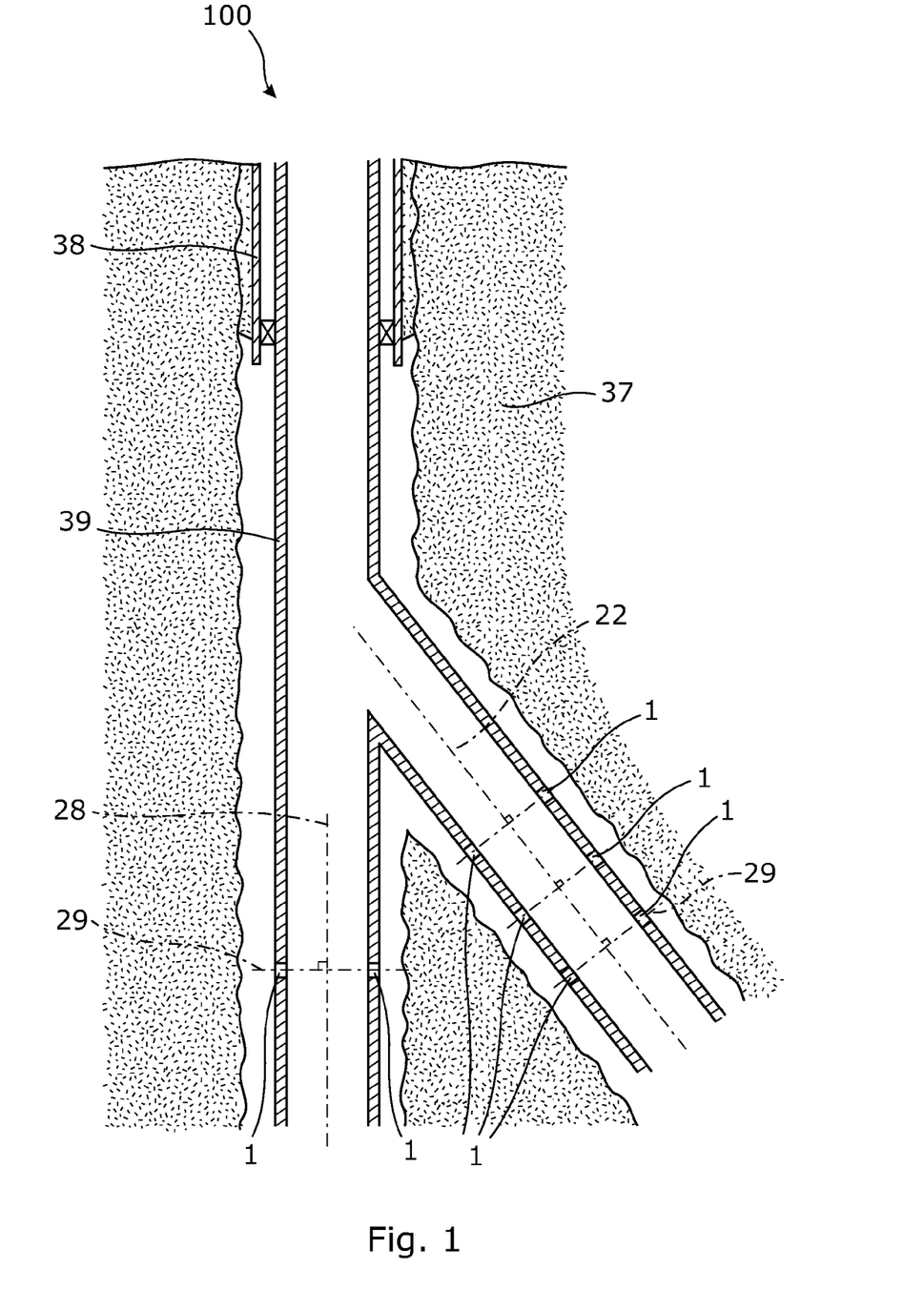
FIG. 1 shows a downhole inflow control system.

FIG. 1 shows a downhole inflow control system 100 comprising a casing 4 in a borehole and a plurality of inflow control valves for controlling the inflow of fluid 2 from a reservoir into the casing 4. The casing 4 has an axial extension 28 and a wall having a wall thickness t. Each inflow control valve 1 has an axial extension 30 in its axial direction 29, and each valve is arranged so that the axial direction of the valve is perpendicular to the axial extension of the casing.

When the inflow control valve has its axial direction perpendicular to the axial extension of the casing, the valve can be inserted from within the casing after the completion has been made. Prior art valves are typically inserted when making the completion and when the reservoir of oil moves, the valves are no longer situated in the right place and have to be closed so that e.g. water is not let into the casing. A valve according to the invention can easily be inserted in a subsequent operation when the oil reservoir moves.

The casing 4 is most often a production casing which, at the part nearest to the surface, is surrounded by a second intermediate casing 18 and, at the part nearest to the bottom, is positioned directly in a reservoir 3. The inflow control valve 1 is arranged in the casing 4 in order to control the fluid 2 from the intermediate casing 18 or the reservoir 3 when flowing into the casing 4.

Figure 2:
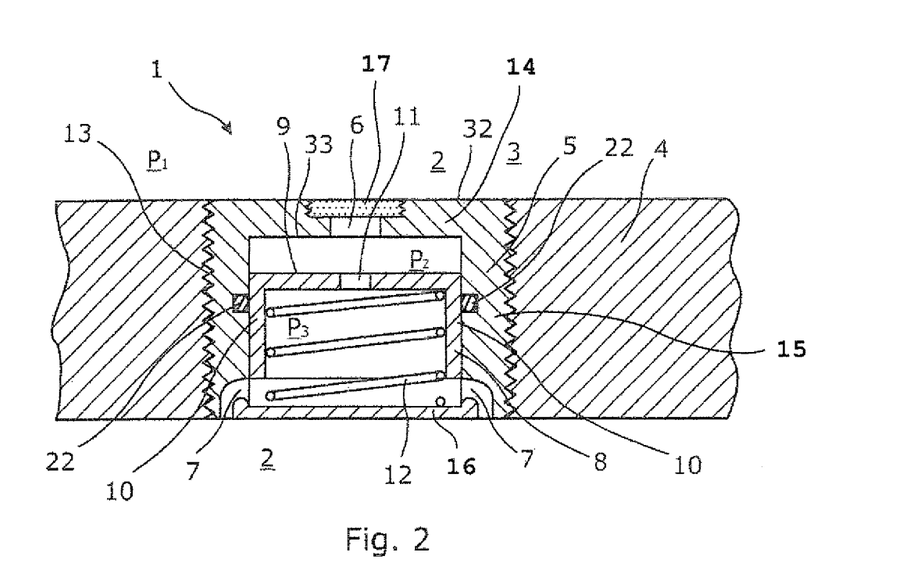
FIG. 2 shows a cross-sectional view of the inflow control valve according to the invention.

The downhole inflow control valve 1 comprises a housing 5 having an inlet 6 and an outlet 7. As can be seen in FIG. 2, the housing 5 is arranged in the casing wall by means of a threaded connection 13. The axial extension 30 of the valve is substantially the same as or smaller than the thickness of the casing wall.

Inside the housing 5, a piston element 8 is arranged, which slides back and forth to narrow the outlet hole of the housing 5. The piston element 8 comprises a face 9 facing the inlet 6 of the housing 5. The piston element 8 further comprises a side 10 abutting the inside of the housing 5 and extending from the face 9 towards the outlet 7 of the housing 5. The face 9 has a piston hole 11 allowing the fluid 2 from the inlet 6 to flow through the piston hole 11 and out through the outlet 7 of the housing 5. The valve 1 further comprises a spring element 12 arranged between the housing 5 and the piston 8, wherein the side 10 of the piston element 8 is able to, at least partly, close the outlet 7 in order to reduce the inflow of fluid 2 into the casing 4 and thus reduce the flow rate of the fluid.

By having a piston element 8 moving inside the valve housing 5, a self-actuated valve 1 with a very simple design which is able to control the inflow of fluid is obtained. This simple design makes the valve easier to manufacture, and furthermore, it may cause fewer parts to fail when the valve 1 is inserted downhole. When inserting the inflow control valve 1 downhole, the valve must be easy to mount, which is not the case when valve holes have to be aligned with existing holes. The inflow control valve 1 is easily installed in an existing casing 4 by milling a hole in the casing with a threaded connection 13, and the valve can then be installed without any further alignments.

The housing 5 has a first, a second 15, and a third 16 wall, and the second wall 15 is arranged between the first 14 and the third wall 16, ensuring that the first 14 and the third wall 16 do not abut one another. The inlet 6 is arranged in the first wall 14 of the housing 5, and the outlet 7 is arranged in the abutting second wall 15. The spring element 12 is arranged within the piston 8 and presses against the face 9 of the piston 8 from the outlet 7 towards the inlet 6.

In FIG. 2, the housing is shaped like a hollow cylinder, and the piston 8 is shaped like a hollow cylinder without a bottom. The face 9 of the piston 8 is thus circular, and the side 10 of the piston 8 is a circumferential side extending from the face 9 towards the third wall 16 of the housing 5 and the outlet 7. In another embodiment, the housing 5 could have a square cross-section, meaning that the housing 5 would have four second walls 15 between the first 14 and the third wall 16.

Figure 5:
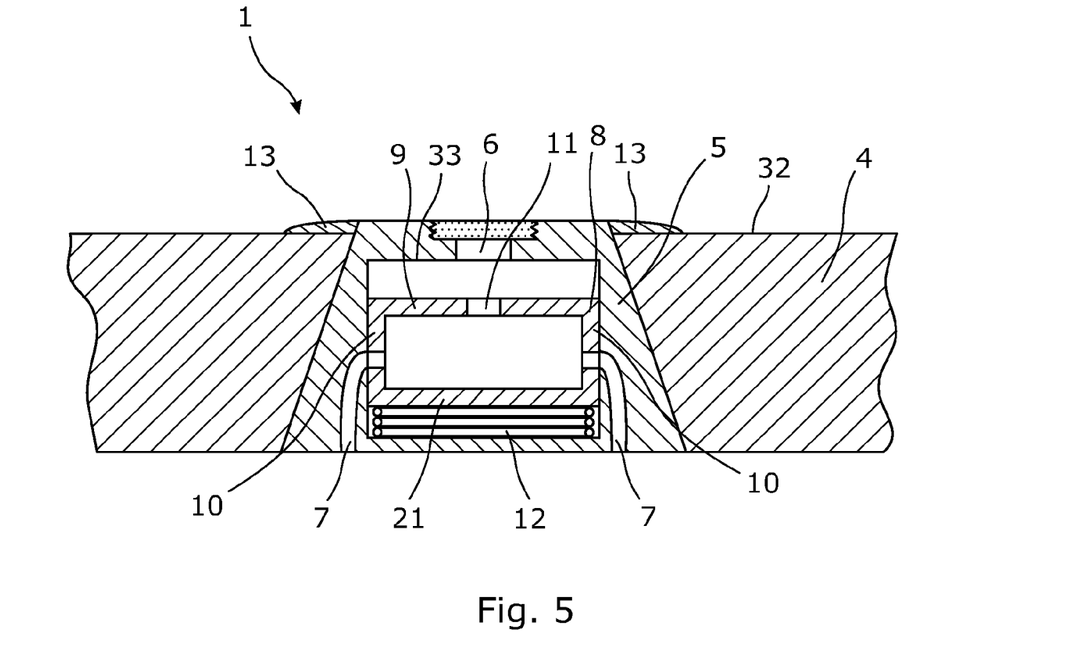
FIG. 5 shows yet another embodiment of the inflow control valve.

In FIG. 5, the side 10 of the piston 8 is also a circumferential side which has two openings arranged outside and in alignment with the outlet 7 of the housing 5, enabling the fluid 2 to flow out of the housing 5 and into the casing 4. If the outlet 7 is to be narrowed, the side 10 of the piston 8 is displaced away from the inlet 6 in the housing 5. This embodiment has the advantage that if the pressure in the reservoir 3 drops because the inlet 6 is blocked by debris, or if the filter or screen is blocked, the spring element 12 forces the piston 8 towards the inlet 6, whereby the outlet 7 is closed.

On the outside of the side 10 of the piston 8, between the opening and the end farthest away from the piston face 9, the side 10 of the piston 8 is arranged with a barb or a projection which enters the outlet 7, causing the piston 8 to be unable to move downwards again. The barb or projection is maintained inside the wall of the piston side 10, and when possible, it swings outwards towards the outlet opening. In this way, the inflow control valve 1 is permanently closed, which makes it possible to arrange a new valve elsewhere in the casing wall, or to replace the valve. If the valve was not locked, and the feature blocking the flow passage over time was removed, the valve would begin to let fluid 2 flow into the casing 4 again.

This is not a desirable situation as it makes optimal management of the production impossible.

The fluid 2 in the reservoir 3 or in the intermediate casing 18 has a first pressure, the fluid 2 after passing the inlet 6 has a second pressure, the fluid 2 after passing the piston opening has a third pressure, and the fluid 2 after passing the outlet 7 has a fourth pressure. When the second pressure is greater than the third pressure and a spring force of the spring element 12, the piston 8 is pushed by the second pressure to, at least partly, close the outlet 7. In this way, the valve is able to control the inflow of fluid into the casing.

As can be seen in FIGS. 2-5, the housing 5 comprises a cavity in which the piston 8 slides. The piston 8 divides the housing 5 into two parts, a first cavity part and a second cavity part which still remain one cavity.

The fluid 2 in the reservoir 3 or the intermediate casing 18 has a first pressure $P_1$, the fluid 2 in the first cavity part after passing the inlet 6 has a second pressure $P_2$, the fluid 2 after passing the piston opening in the second cavity part has a third pressure $P_3$, and the fluid 2 after passing the outlet 7 has a fourth pressure $P_4$. When the second pressure is greater than the third pressure and a spring force F of the spring element, the piston 8 is pushed by the second pressure to, at least partly, close the outlet 7.

In FIG. 2, the inflow control valve 1 comprises two outlets 7. In another embodiment, it may comprise more outlets 7.

Figure 3:
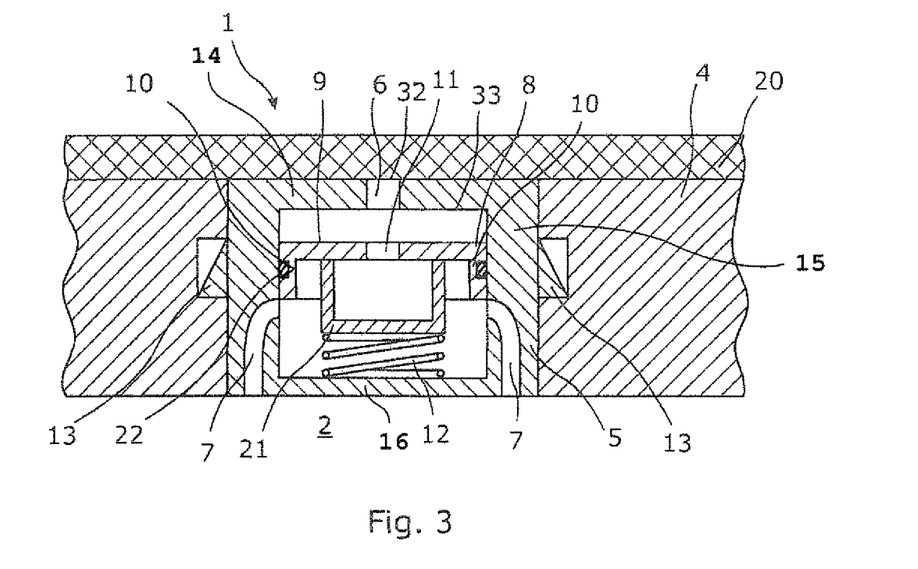
FIG. 3 shows another embodiment of the inflow control valve.
Figure 4:
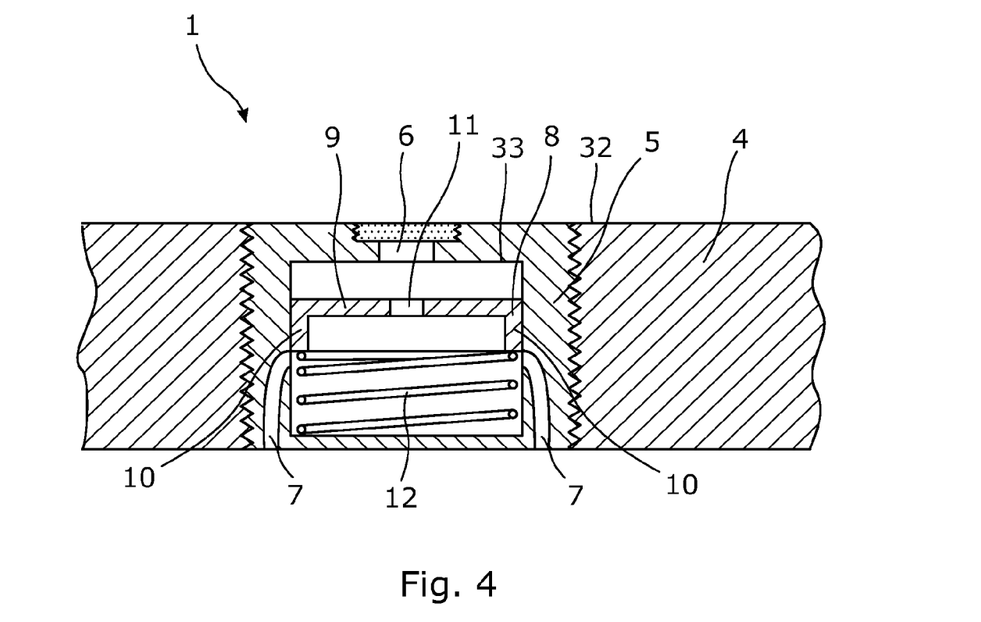
FIG. 4 shows yet another embodiment of the inflow control valve.

In FIGS. 2-4, the spring element 12 is shown as a helical spring. In FIG. 5, the spring element 12 is a disk spring of discs in layers. The spring element 12 may be any kind of suitable spring means, such as a leaf spring or a rubber element.

In FIG. 2, the inflow control valve 1 is fastened to the casing by means of threads, but it may also have other fastening means 13, such as a plurality of projecting parts for extending into a groove in the casing wall. The fastening means 13 may in this way be a bayonet lock. In FIG. 3, the valve has fastening means 13 in the form of projections functioning as barbs when released into the groove in the casing wall. The inflow control valve 1 may also have the shape of a tapering cone fitting into a cone-shaped opening in the casing wall. In order to fasten the valve when inserted into the casing 4, the valve is provided with fastening means 13 in the form of arms 13 which are spring-loaded and released when the tip of the valve enters the outside of the casing 4 as shown in FIG. 5. In this way, the inflow control valve is easily insertable into existing wells from within the well.

The piston element 8 slides inside the housing 5, and in order to force the fluid to penetrate only through the piston hole 11, sealing means 22 may be arranged between the piston side 10 and the second wall 15 of the housing 5. The sealing means 22 may be fastened in a circumferential groove in the piston 8 as shown in FIG. 2, or in a circumferential groove housing wall as shown in FIG. 3. The sealing means 22 may be an O-ring or any other suitable sealing means 22.

The inflow control valve 1 comprises a filter 17 preventing solid elements in the fluid 2 from entering the valve through the inlet 6. The filter 17 is thus arranged in an opening in the housing 5 where it is connected to the housing 5 by means of a threaded connection 13. As shown in FIG. 3, a screen 20 may be positioned on the outside of the casing 4, causing the fluid 2 to enter through the screen 20 before entering the inlet 6.

In FIG. 3, the piston element 8 has a bottom face fastened to the face 1 by means of bars, pins or the like elongated elements, and the spring element 12 is arranged between the bottom face and the housing 5. The piston element 8 may also be a hollow cylinder or another hollow element having e.g. a square cross-section as shown in FIG. 5. The spring element 12 may be arranged between the third wall 16 of the housing 5 and the bottom of the piston element 21. On the outside of the piston 8, the side 10 may also be barbed or provided with a projection to inhibit a spring force, causing the projection to enter the outlet 7 and thereby closing it.

The inflow control valve 1 comprises a water detection means which closes the valve when the fluid 2 flowing in from the reservoir 3 contains too much water. Similarly, the inflow control valve 1 comprises a gas detection means which closes the valve when the fluid flowing in from the reservoir 3 contains too much gas. The valve may also comprise a density detection means which detects changes in the density of the fluid 2, enabling the valve to be closed if the density is lower or higher than a predetermined density.

The valve comprises closing means enabling it to close itself when the fluid 2 reaches a too high water or gas content, or the density has changed too much. The valve may also be closed via central control at the surface or by a tool 101 inserted into the casing 4. By being able to monitor the water and/or gas content and close the valve when the limit is reached, it becomes much easier to maintain a high quality production.

If the piston element 8 is a hollow element as shown in FIG. 5 and is provided with barbs or projections on the outside, the closing procedure may be performed by drilling a hole in the bottom of the inflow control valve 1 and subsequently pushing up the piston 8 until the projections unfold in the outlets 7 and thereby close the valve.

Figure 6:
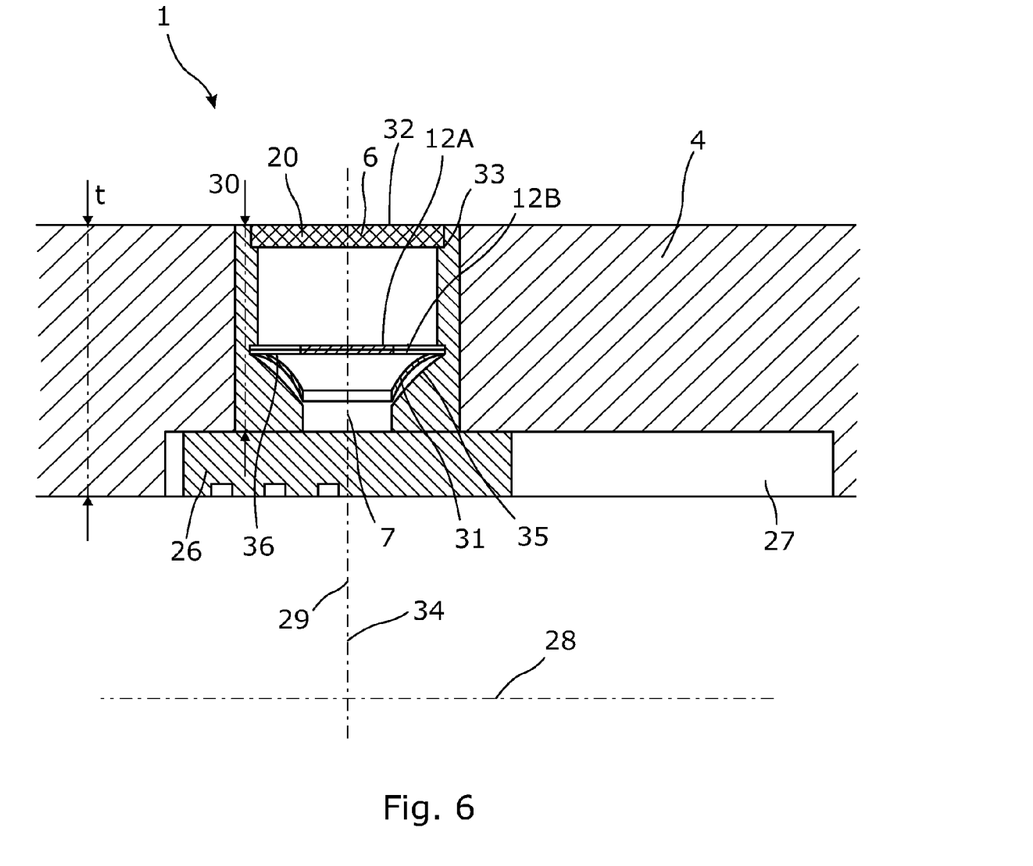
FIG. 6 shows yet another embodiment of the inflow control valve.

FIG. 6 shows another embodiment of the inflow control valve in which the axial extension 30 of the valve is smaller than the thickness of the casing wall due to the fact that a sliding sleeve 26 is arranged in a recess 27. The sliding sleeve 26 is shown in its closed position preventing the flow of fluid from the valve from flowing into the casing, but also preventing the fluid in the casing from escaping through the inflow control valve. The sliding sleeves 26 are arranged opposite the valves and slidable from an open position to a closed position so that the sleeves slide back and forth in recesses 27 in the wall of the casing and form part of the wall thickness.

When having a slidable sleeve 26 opposite the valve as part of the casing wall, the sliding sleeve 26 can be closed when pressurising the casing 4 from within in order to perform an operation requiring high pressurised fluid, such as when expanding annular barriers. When the operation requiring high pressure is finalised, the sliding sleeve 26 can be open, and fluid from the annulus is able to flow into the casing through the valve.

By having a sleeve sliding in a recess in the casing, the inner diameter of the casing is not decreased, which is advantageous as a decrease in diameter of the casing may limit subsequent operations in the well.

Also in this embodiment, the spring element is springy along the axial direction of the valve perpendicular to the axial extension of the casing for providing a spring force. The housing has a seat 35, a membrane 31 and the spring element is a diaphragm acting towards the seat to close valve openings 36 in the valve. The spring element comprises two spring plates each formed as a star and arranged one on top of the other displaced in relation to each other so that the tips of the star-shaped plates form openings therebetween. When the pressurised fluid from the reservoir flows in through the screen 20 in the inlet, the fluid forces the star-shaped plates 12A, 12B down towards the seat and the membrane 31, minimising the passage through the openings. The membrane 31 has an aperture in its centre through which the fluid passes before entering the outlet 7 and after passing the openings.

Figure 7:
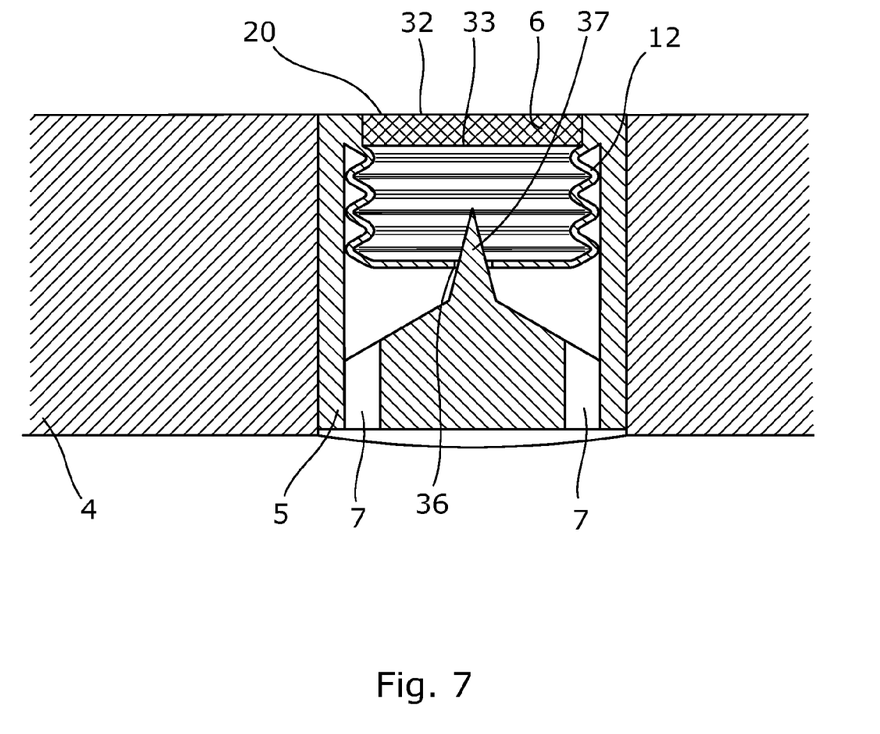
FIG. 7 shows yet another embodiment of the inflow control valve.

Another embodiment of the inflow control valve 1 is shown in FIG. 7. The valve comprises a screen 20 arranged in the inlet 6 of the housing 5 and a spring element 12 in the form of a bellows. The housing 5 has a projection 37 tapering from the end of the housing 5 comprising the outlet 7 towards the inlet 6. The bellows have a valve opening 36 which the projection penetrates so that when the fluid flows in through the inlet 6 of the valve from the formation, the pressure of the fluid forces the bellows to extend causing the valve opening 36 to travel towards the outlets 7, and the valve opening 36 decreases as the bellows travel due to the projection tapering and filling out part of the valve opening 36. In this way, high pressure caused from the fluid pressure in the formation decreases the valve opening, and thus the inflow of fluid is controlled. As the pressure in the formation drops, the bellows are retracted again and more fluid is let through the valve opening 36.

In this way, the inlet of the housing of the valves extends from an outer face 32 of the housing 5 to an inner face 33 of the housing 5 in a radial direction 34 of the casing 4, making it possible to direct the fluid in the radial direction. And the axial extension 30 of the valves is substantially the same as or smaller than the thickness of the casing wall 102.

The closing means of the detection means may comprise a swellable material arranged in the inlet 6 or in another opening through which the fluid 2 flows, causing the swellable material to swell when the fluid 2 contains too much water or gas.

The detection means may also comprise a dissolvable material comprising a unique identifier which is released when the material dissolves. The dissolvable material may be a plastic material containing the identifier.

The gas or water detection means or the density detection means may comprise a unique identifier, such as a chemical or radioactive tracer, which is released when a predetermined limit is reached. In another embodiment, the filter 17 comprises and/or is coated with the unique identifier. In yet another embodiment, the valve comprises a chamber filled with the unique identifier. In this way, each valve can release a unique identifier identifying that specific valve in order to detect which valve needs to be closed to control and optimise production.

The unique identifier may be a hydrophilic identifier which is released when the fluid 2 contains water. The chamber filled with the unique identifier can be opened by means of the gas or water detection means.

Figure 8:
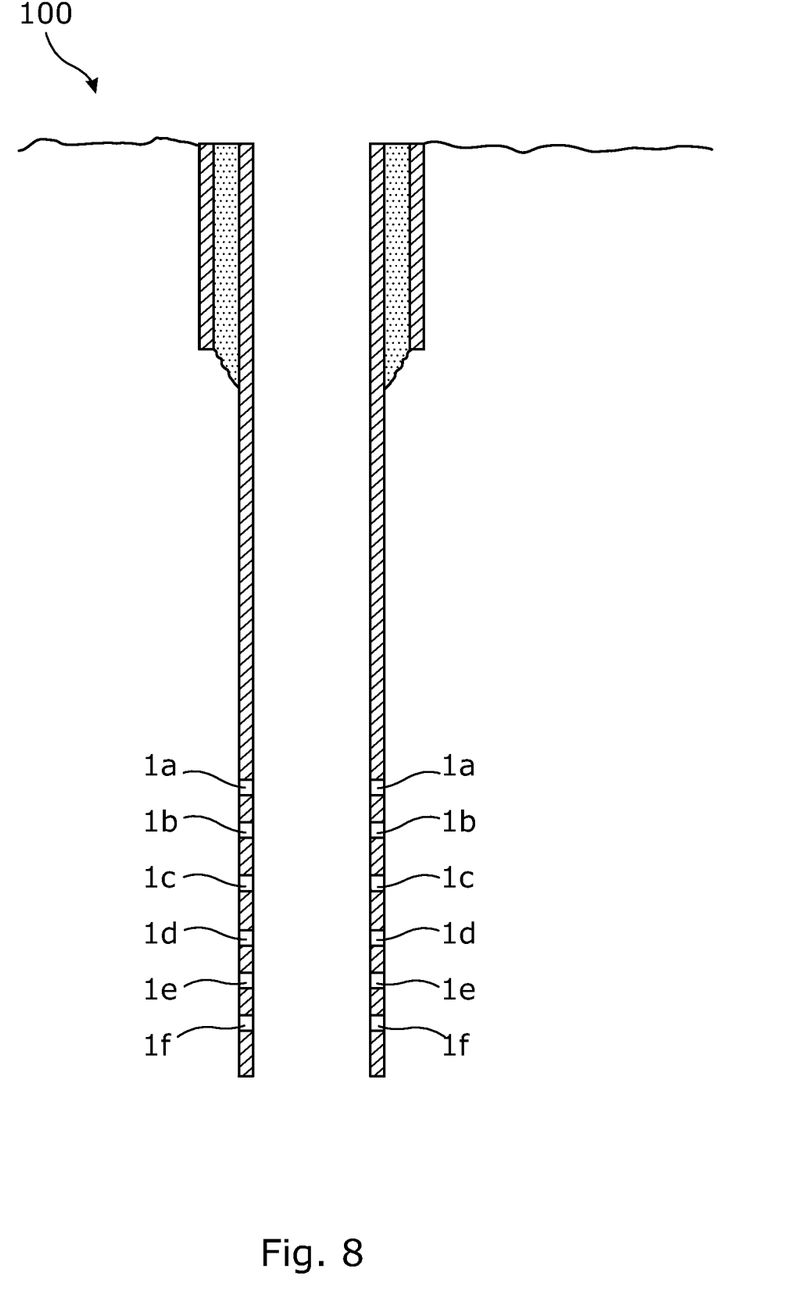
FIG. 8 shows the downhole inflow control system according to the invention.

FIG. 8 shows a downhole inflow control system 100 for controlling an inflow of fluid 2 into a casing 4 from outside a casing 4, such as from a reservoir 37 or from an intermediate casing 38. The downhole system 100 comprises a casing 4 having a casing wall and a plurality of inflow control valves 1 arranged spaced apart in the casing wall as shown in FIG. 8. As further shown in FIG. 8, there are several valves 1a, 1b, 1c, 1d, 1e and 1f. These valves vary in that they each have a unique identifier.

The inflow control valve 1 of the system 100 may be the valve previously mentioned.

The downhole inflow control system 100 may comprise a screen 20 causing the fluid 2 to flow through the screen 20 before entering the inflow control valve 1. In this way, the fluid 1 is slowed down, and large solid elements are prevented from entering the valve. On the inside of the casing 4 outside the outlets 7, the system may have a sleeve which is able to close off the outlet 7 of the valve.

Figure 9:
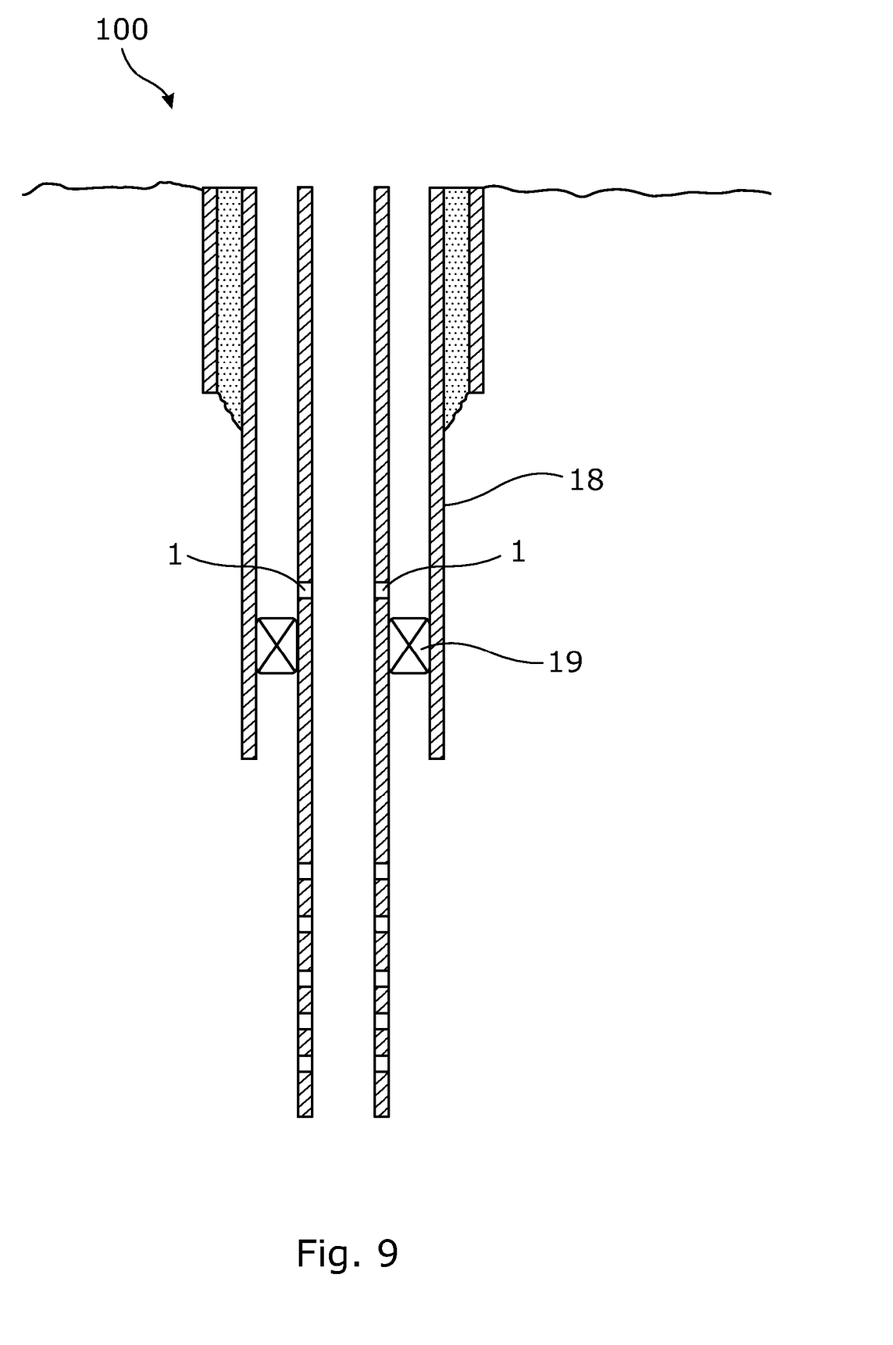
FIG. 9 shows another embodiment of the inflow control system.
Figure 10:
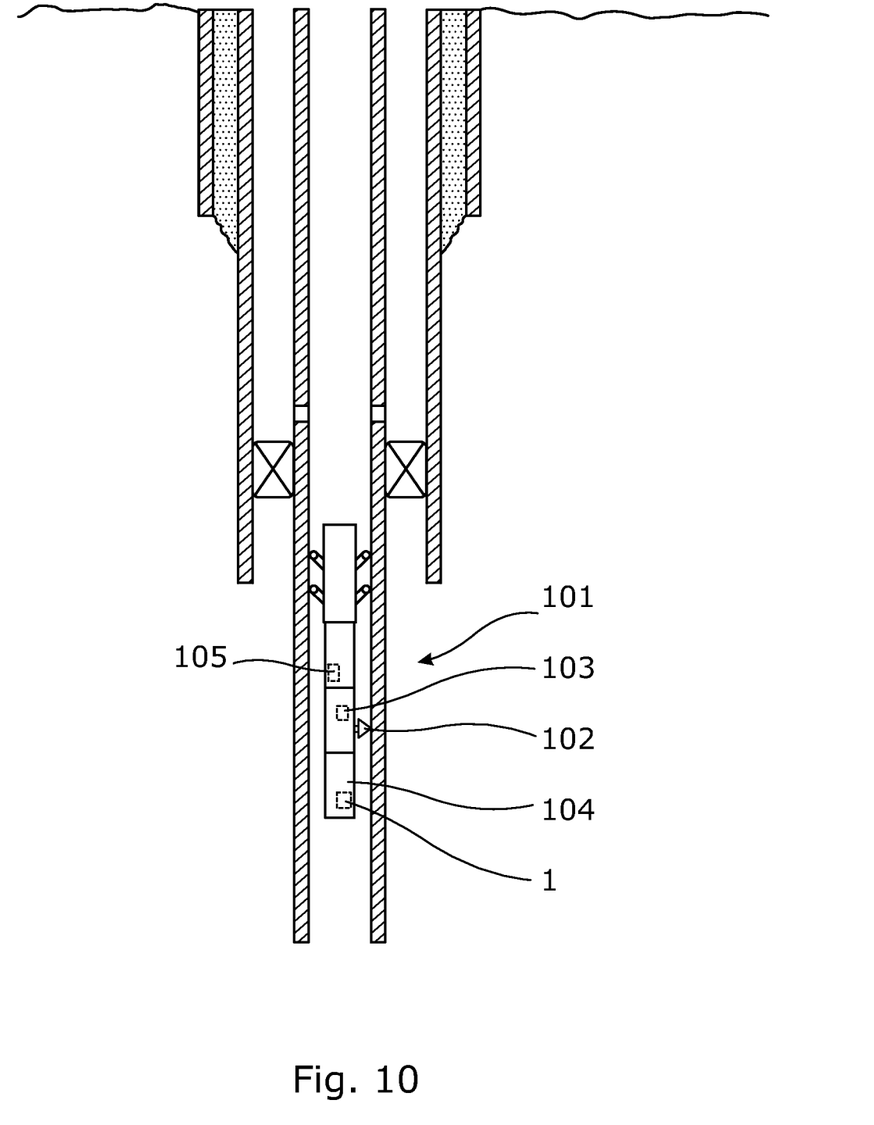
FIG. 10 shows yet another embodiment of the inflow control system.

As shown in the system of FIG. 9, the casing 4 is a production casing which is enclosed by a surrounding intermediate casing 18 and in which the fluid 2 is gas which is pumped down into the intermediate casing 18 and into the valves of the production casing. Packers 19 are arranged between the production casing and the intermediate casing 18. Instead of using an artificial lift tool, gas is pumped down into the space between the intermediate casing 18 and the production casing and enters the production casing through the inflow control valves 1. In this way, gas is pumped into the fluid 2 in the form of bubbles lifting the fluid 2.

The inflow control valve 1 of the system 100 may also comprise a chamber filled with a unique chemicals identifier.

Furthermore, the system 100 may comprise control means for controlling the closing of each valve from the surface. The system 100 may also comprise a tool 101 which is inserted into the casing 4 in order to close the outlets 7 of the valves.

The inflow control valves 1 of the system 100 may be inserted into existing wells, and the valves may be replaced if they do not operate satisfactorily. In order to insert a valve, the system 100 comprises a tool 101 having a milling head for making an opening in the casing wall 102, a means for making a fastening recess or threads in the opening 103, and an insertion means 104 for inserting a valve into the opening.

When the system 100 is used to replace a valve, it comprises a tool 101 for retrieving the valve in a casing wall, comprising a key means 105 for inserting into a recess in the valve and for unthreading of the valve, or for releasing the fastening means 13 of the valve in order to retrieve the valve. Furthermore, the system comprises an insertion means 104 for inserting a valve into the opening.

Accordingly, when replacing a downhole inflow control valve in a casing downhole, the casing having a casing wall, a tool is introduced into the casing and lowered to the valve to be replaced. The valve is subsequently unfastened from the casing wall and retrieved from the casing, causing an opening in the casing wall to be exposed. Subsequently, a new valve is inserted in the opening, which is fastened to the casing wall.

In order to detect any identifiers sent by one or several valves, the system comprises means for analysing the fluid for the purpose of locating the existence of unique identifiers.

Thus, if it is necessary during production to detect the position of a specific inflow control valve 1 among a plurality of inflow control valves 1 arranged spaced apart in a casing wall downhole in which each valve has a chamber filled with a unique identifier, an analysis of a fluid is performed for the purpose of locating the existence of unique identifiers. Subsequently, the fluid analysis is compared with the unique identifier of each valve, and this comparison forms the basis of a determination of the specific valve.

Furthermore, existing wells may according to the present invention be fitted with downhole inflow control valves 1 by retrofitting these. This may be performed by the following steps introducing a tool 101 into the casing 4 and lowering the tool 101 to a predetermined position, providing an opening in the casing wall, inserting the downhole inflow control valve 1 in the opening, and fastening the downhole inflow control valve 1 to the casing wall.

By fluid 2 or well fluid is meant any type of fluid which may be present in oil or gas wells, such as natural gas, oil, oil mud, crude oil, water etc. By gas is meant any type of gas composition present in a well, completion or open hole, and by oil is meant any type of oil composition, such as crude oil, an oil-containing fluid etc. Gas, oil and water fluids may therefore all comprise other elements or substances than gas, oil and/or water, respectively. The fluid may also be a combination of gas, oil, water and small solids in the fluid.

By a casing 4 is meant all types of pipes, tubings, tubulars etc. used downhole in relation to oil or natural gas production.

In the event that the tools are not submergible all the way into the casing 4, a downhole tractor can be used to push the tools all the way into position in the well. A downhole tractor is any type of driving tool capable of pushing or pulling tools in a well, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A downhole inflow control system for controlling an inflow of fluid into a casing from outside the casing, such as from a reservoir or an intermediate casing, comprising:
   the casing having an axial extension and a wall having a wall thickness;
   an inflow control valve having a housing comprising a seat, an axial extension in an axial direction along the housing, and a spring element moving in relation to the housing, thereby controlling the inflow of fluid through the valve from an inlet of the housing to an outlet of the housing;
   wherein:
   the valve is arranged so that the axial direction of the valve is perpendicular to the axial extension of the casing;
   the spring element is springy along the axial direction of the valve and perpendicular to the axial extension of the casing to provide a spring force for controlling the flow of fluid through the valve from the inlet to the outlet of the housing;
   the spring element is a diaphragm acting towards the seat to close an opening;
   the valve is configured to require the fluid to flow through a flow path of the diaphragm as the fluid passes through the valve to enter the casing from outside the casing; and
   the diaphragm is configured to deform towards a seat of the housing to close the flow path through the diaphragm under pressure, the area of the flow path through the diaphragm being maximal when the diaphragm is un-deformed.

2. The downhole inflow control system according to claim 1, wherein the axial extension of the valve is substantially the same as or smaller than the thickness of the casing wall.

3. The downhole inflow control system according to claim 1, wherein the inlet of the housing extends from an outer face of the housing to an inner face of the housing in a radial direction of the casing, enabling direction of the fluid in the radial direction.

4. The downhole inflow control system according to claim 1, further comprising a sleeve arranged opposite the valve and being able to slide from an open position to a closed position.

5. The downhole inflow control system according to claim 4, wherein the sleeve slides back and forth in a recess in the wall of the casing and forms part of the wall thickness.

6. The downhole inflow control system according to claim 1, comprising a tool for placing a valve in a casing, the tool comprising:
   a milling head extendable in a radial direction of the tool configured to create an opening in the casing wall,
   a cutting device configured to create a fastening recess or threads in the opening, and
   an insertion device configured to insert the valve into the opening.

7. The downhole inflow control system according to claim 1, wherein the diaphragm of the valve comprises at least one valve opening.

8. The downhole inflow control system according to claim 1, further comprising a unique identifier.

9. A method for fitting the inflow control valve according to claim 1 into an existing casing downhole, the casing having a casing wall, the method comprising:
   introducing a tool into the casing and lowering the tool to a predetermined position,
   providing an opening in the casing wall,
   inserting the downhole inflow control valve into the opening, and
   fastening the downhole inflow control valve to the casing wall.

10. The method according to claim 9, further comprising providing the opening with a fastening structure configured to enable the fastening of the valve to the casing wall.

11. A method for replacing the downhole inflow control valve of claim 1 in a casing downhole, the casing having a casing wall, the method comprising:
   introducing a tool into the casing and lowering the tool to be adjacent to the valve to be replaced;
   unfastening the valve from within a thickness of the casing wall;
   retrieving the valve from within the thickness of the casing and thereby creating an opening in the casing wall;
   inserting a new valve into the opening; and
   fastening the new valve within the opening in the casing wall.

12. A method for detecting a downhole position of a first inflow control valve according to claim 1 during production among a plurality of inflow control valves arranged spaced apart in a casing wall of a casing downhole, wherein each valve comprises a unique identifier, the method comprising:
   analysing a fluid for the purpose of locating the existence of unique identifiers;
   comparing the analysis of the fluid with the unique identifier of each valve; and
   determining the specific valve based on the comparison.

13. The tool according to claim 6, wherein the tool for retrieving a valve in a casing wall comprises:
   a milling head configured to create an opening in the casing wall;
   a fastening creation device configured to create a fastening recess or threads in the opening; and
   an insertion device configured to insert a valve into the opening; or
   a removal device configured to be inserted into a recess in the valve and unthread the valve, or configured to release a fastening device holding the valve within the casing wall.

14. The downhole inflow control system according to claim 1, wherein the spring element comprises two spring plates.

15. The downhole inflow control system according to claim 14, wherein each spring plate is formed as a star with tips and arranged one on top of the other so that the tips of the star shaped plates form openings therebetween.

16. The downhole inflow control system according to claim 1, wherein the casing of the system comprises a screen allowing the fluid to flow in through the screen before entering the inflow control valve.

17. The method according to claim 10, further comprising fastening the valve by screwing the valve into the casing wall or locking the valve into the opening.

18. The downhole inflow control system according to claim 7, wherein the at least one opening is configured to allow fluid to pass through the diaphragm until a predetermined pressure level acts upon the diaphragm.

19. The downhole inflow control system according to claim 18, wherein the at least one opening is arranged about the perimeter of the diaphragm.

20. The downhole inflow control system according to claim 7, wherein the at least one opening is configured to be a passage through at least two star shaped spring plates at their tips.

21. The downhole inflow control system according to claim 20, wherein the passage is configured to be the result of the tips of the stars being arranged out of alignment.

* * * * *